(12) United States Patent
Wild (10) Patent No.: US 6,196,733 B1
(45) Date of Patent: Mar. 6, 2001

(54) STRAIN RELIEF APPARATUS FOR OPTICAL CONNECTOR (75) Inventor: Ronald L. Wild, Carmel, IN (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/327,805

(22) Filed: Jun. 8, 1999

(51) Int. Cl.[7] .................................................. G02B 6/38
(52) U.S. Cl. ............................................ 385/86; 385/139
(58) Field of Search ...................................... 385/86, 139

(56) References Cited

U.S. PATENT DOCUMENTS

| 5,461,690 | 10/1995 | Lampert | 385/100 |
|---|---|---|---|
| 5,462,457 | 10/1995 | Schroepfer et al. | 439/736 |
| 5,481,634 | 1/1996 | Anderson et al. | 385/76 |
| 5,538,438 | 7/1996 | Orlando | 439/344 |
| 5,579,425 | 11/1996 | Lampert et al. | 385/59 |
| 5,638,474 | 6/1997 | Lampert et al. | 385/78 |
| 5,845,036 | * 1/2000 | De Marchi | 385/139 |
| 5,923,805 | * 7/1999 | Anderson et al. | 385/86 |
| 6,017,153 | * 1/2000 | Carlisle et al. | 385/86 |

* cited by examiner

Primary Examiner—Jon Henry (57) ABSTRACT

A preferred embodiment of a strain relief apparatus includes a body member incorporating a first end for facing the cable-receiving end of a connector, a second end for facing away from the cable-receiving end of a connector, and a flap extending from the body member. The flap is movable between an unbiased position and a forwardly-displaced position so that in its unbiased position the flap is oriented in an overlying relationship with a trigger of the connector. In its forwardly-displaced position, the flap urges the trigger toward the bottom side of the connector such that the trigger urges a latch of the connector to its unlatched position. Preferably, the flap has a handle extending therefrom, with the handle being configured so that a technician can reposition the flap from its unbiased position to its forwardly-displaced position as well as manipulate the connector, such as during patching operations.

19 Claims, 12 Drawing Sheets

STRAIN RELIEF APPARATUS FOR OPTICAL CONNECTOR

CROSS-REFERENCE TO RELATED APPLICATIONS

Reference is made to the following U.S. patent application Ser. No. 09/253,195, (Wild 20; 60103-1360), filed on Feb. 19, 1999; U.S. patent application Ser. No. 09/239,902 (Wild 21; 60103-1370), filed on Jan. 29, 1999; U.S. patent application Ser. No. 09/222,421 (Goodrich 9-15, 60103-1160), filed on Dec. 29, 1998; U.S. patent application Ser. No. 09/222,618 (Goodrich 10-16, 60103-1170), filed on Dec. 29, 1998; U.S. patent application Ser. No. 09/222,749 (Curtis 1-7-19, 60103-1180), filed on Dec. 29, 1998, and; U.S. patent application Ser. No. 09/222,504 (Conorich 16-6-17; 60103-1190), filed on Dec. 29, 1998.

BACKGROUND OF THE INVENTION

1. Field of the Invention

The present invention relates to communications connectors and, more particularly, to a strain relief apparatus for use with a communications connector that allows the connector to be utilized with pull-insertion type patch panels, for instance.

2. Description of the Related Art

In buildings and, more particularly, within communications connection closets in buildings, various transmission media typically are connected to each other and to incoming and outgoing lines by means, such as couplings, which are mounted to patch panels. Patch panels generally are mounted within a communications closet, such as to a wall or other mounting surface, and incorporate a series of couplings for interconnecting the various transmission media. Transmission media, such as buffered optical fibers formed into patch cords, for instance, often incorporate connectors at their ends. These connectors are configured for mating with, for example, the couplings of a patch panel.

Optical couplings come in a variety of types, each having a unique interface designed to mate with an optical fiber connector of like type. One frequently used coupling is referred to as an ST® coupling, which is disclosed, for example, in U.S. Pat. No. 4,934,785 issued to Mathis et al. ST is a registered trademark of Lucent Technologies, Inc. Another common type of optical fiber coupling is the SC type coupling that is shown and described in U.S. Pat. No. 5,212,752 issued to Stephenson et al. Additionally, U.S. Pat. No. 5,274,729 issued to King et al. shows examples of couplings for the ST, SC and the FC types of couplings.

One recently developed optical fiber connector is the LC® connector, LC being a registered trademark of Lucent Technologies, Inc. A typical prior art simplex LC connector includes a plug end, which is configured to be inserted into a jack receptacle, and a cable entrance end, which receives an optical cable. The connector forms an optical connection by abutting the end face of its ferrule against the end face of another ferrule, which is precisely aligned therewith, and which typically is mounted within a jack receptacle or coupling. The connector also includes a latch for securing the connector to a coupling in order to prevent unintended decoupling of the connector. Typically, the latch is formed as a molded portion of the connector and includes a "living hinge" which allows the latch to be moved up and down in a direction that is perpendicular to a central axis of the connector. Additionally, the connector incorporates a trigger which also includes a "living hinge" that allows the trigger to move up and down in a manner similar to that of the latch. The latch and trigger are adapted to engage each other so that when the trigger is depressed, its free end engages the free end of the latch, thereby depressing the free end of the latch inwardly toward the connector body and, thus, allowing the connector to be decoupled from a coupling.

Prior art duplex LC type connectors typically are constructed by joining together a pair of simplex connectors, such as a pair of the connector previously described, for example. The simplex connectors can be joined together by using one or more clips, which typically engage between adjacent side surfaces of the connectors. Although each simplex connector includes its own latch and trigger, the clip provides a planar structure which engages the upper surface of each trigger, thereby enabling a technician manually to deflect both triggers and, thus, both latches simultaneously.

Heretofore, it has been commonplace to orient patch panel couplings within a patch panel so that the connector-receiving ends of the couplings face forward, e.g. away from the mounting surface to which the patch panel is mounted. So configured, a transmission media connector, such as an LC connector, for instance, typically has an insertion direction for mating with a coupling of the patch panel that is oriented toward the mounting surface of the patch panel, thereby providing a technician with convenient access for connecting the connector to, and removing the connector from, the coupling. Since the cable of an optical fiber patch cord typically extends from its connector in a direction which is approximately 180 degrees from its insertion direction, the aforementioned patch panel configuration presents patch cord cables which extend away from the patch panel couplings and the patch panel mounting surface. The patch cord cables then tend to hang downwardly in front of the patch panel. When carefully dressed, these cables appear neat and orderly and can facilitate efficient patching efforts by a technician, because the patch cords and the patch panel couplings are readily accessible. However, when the cables are not carefully dressed, a general appearance of disorder can result as the cables inherently tend to form loops in front of the couplings. In extreme cases, the cables may become entangled or snarled with adjacent cables, thereby potentially hindering a technician's patching efforts.

Recently, several patch panel designs, such as those described in U.S. patent applications Ser. No. 09/253,195, (Wild 20; 60103-1360), filed on Feb. 19, 1999; U.S. patent application Ser. No. 09/239,902 (Wild 21; 60103-1370), filed on Jan. 29, 1999; U.S. patent application Ser. No. 09/222,421 (Goodrich 9-15, 60103-1160), filed on Dec. 29, 1998; U.S. patent application Ser. No. 09/222,618 (Goodrich 10-16, 60103-1170), filed on Dec. 29, 1998; U.S. patent application Ser. No. 09/222,749 (Curtis 1-7-19, 60103-1180), filed on Dec. 29, 1998, and; U.S. patent application Ser. No. 09/222,504 (Conorich 16-6-17; 60103-1190), filed on Dec. 29, 1998, have their connector-receiving cavities oriented toward the patch panel mounting surface, thereby presenting an insertion direction that generally is away from the mounting surface of the patch panel and toward the technician. This configuration directs the patch cord cable extending from a connector engaged within one of the connector-receiving cavities away from a technician and toward the mounting surface. This coupling configuration typically requires that a connector of a patch cord be pulled toward the technician so as to engage the connector within the connector-receiving cavity of the coupling, hence, these patch panels generally are referred to as "pull-insertion type" patch panels.

Insertion and removal of prior art patch cord connectors into and from pull-insertion type patch panels can be difficult because typical prior art connectors are not easily graspable, thereby making it difficult for a technician to grasp the connector about its exterior so that the connector can be manipulated about the patch panel, such as during patching operations. The difficulty of not being able to grasp a prior art connector easily also is exacerbated by increases in the coupling density of many patch panels, resulting in a virtual inability of a technician to grasp a connector about the sides of its housing while attempting to engage the connector within the connector-receiving cavity of a coupling because of the reduced spacing between adjacent couplings, i.e. the technician typically can not manipulate the connector without interfering with, or being interfered by the connectors of adjacent couplings.

Therefore, there is a need to provide improved communications connectors, which address these and other shortcomings of the prior art.

BRIEF SUMMARY OF THE INVENTION

Certain objects, advantages and novel features of the invention will be set forth in part in the description that follows and in part will become apparent to those skilled in the art upon examination of the following. The objects and advantages of the invention may be realized and obtained by means of the instrumentalities and combinations particularly pointed out in the appended claims.

The present invention generally is directed to a strain relief apparatus which preferably includes a body member incorporating a first end for facing the cable-receiving end of a connector, a second end for facing away from the cable-receiving end of a connector, and a flap extending from the body member. The flap is movable between an unbiased position and a forwardly-displaced position so that in its unbiased position, the flap is oriented in an overlying relationship with a trigger of the connector. In its forwardly-displaced position, the flap urges the trigger toward the bottom side of the connector such that the trigger urges the latch of the connector to its unlatched position. Preferably, the flap has a handle extending therefrom, with the handle being configured so that a technician can reposition the flap from its unbiased position to its forwardly-displaced position as well as manipulate the connector, such as during patching operations.

In accordance with another aspect of the present invention, a patch cord incorporating the strain relief apparatus is provided. In a preferred embodiment of the patch cord, the patch cord includes a first cable, a connector and a body member, with the cable-receiving end of the connector being adapted to receive the first cable. The connector has a latch and a trigger mounted thereon, with the latch being movable between a latched position and an unlatched position, such that in its latched position, the latch is adapted to secure the connector to a coupling, and in its unlatched position, the latch is adapted to decouple the connector from the coupling. The trigger is slidably engagable with the latch so that deflecting the trigger toward the connector urges the latch to its unlatched position. The body incorporates a flap that is movable between an unbiased position and a forwardly-displaced position. In its unbiased position, the flap is oriented in an overlying relationship with the trigger, and in its forwardly-displaced position, the flap urges the trigger toward the connector, thereby urging the latch to its unlatched position. Additionally, the flap has a handle that is configured such that moving the handle allows the flap to be repositioned from its unbiased position to its forwardly-displaced position.

In accordance with another aspect of the present invention, patch cords incorporating the strain relief apparatus can be integrated into patch panels, preferably of the pull-insertion-type. In a preferred embodiment, the patch panel includes at least one patch cord (preferably configured as described hereinbefore), a first cable, and a plurality of couplings. Each of the couplings has a connector-receiving cavity configured to receive the connector of a patch cord in a first direction so that the first cable of the patch cord is directed toward the mounting surface of the patch panel when the connector is engaged within the connector-receiving cavity.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
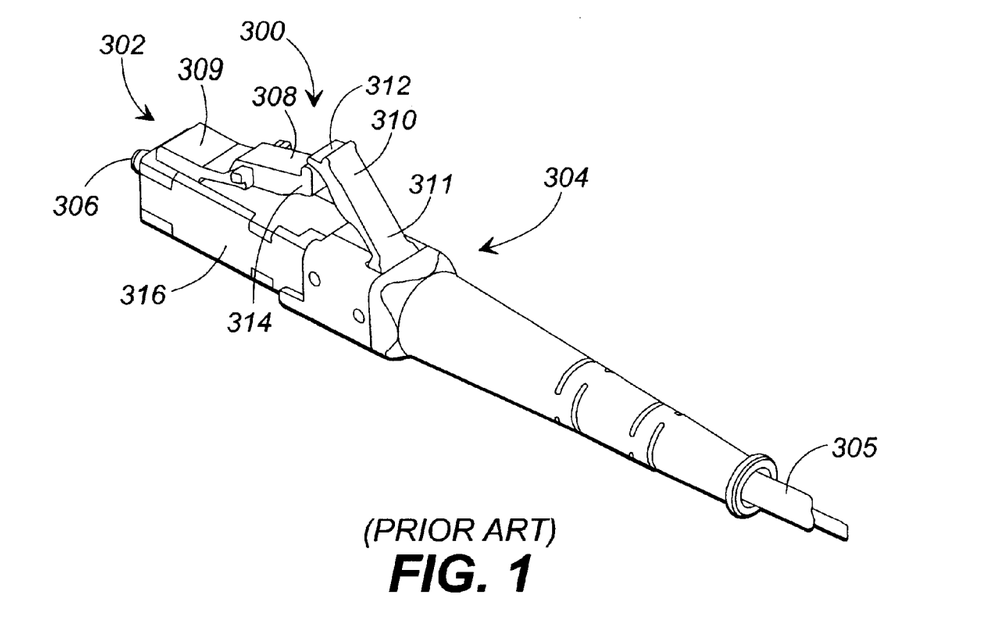
FIG. 1 is a perspective view of a prior art simplex LC connector.

Reference will now be made in detail to the description of the invention as illustrated in the drawings, wherein like reference numbers indicate like parts throughout the several views. As shown in FIG. 1, a representative prior art simplex LC connector 300 includes a plug end 302, which is configured to be inserted into a jack receptacle, and a cable entrance end 304, which receives an optical cable 305. Connector 300 forms an optical connection by abutting the end face of ferrule 306 against the end face of another ferrule, which is precisely aligned therewith, and which typically is mounted within a jack receptacle or coupling. The connector 300 also includes a latch 308 for securing the connector to a coupling in order to prevent unintended decoupling of the connector from the coupling. Typically, latch 308 is formed as a molded portion of the connector and includes a "living hinge" 309 which allows the latch to be moved up and down in a direction that is perpendicular to a central axis of the connector. Additionally, the connector 300 incorporates a trigger 310 which also includes a "living hinge," e.g. hinge 311, that allows the trigger to move up and down in a manner similar to that of the latch 308. The latch 308 and trigger 310 are adapted to engage each other so that when the trigger is depressed, its free end 312 engages the free end 314 of the latch, thereby depressing the free end 314 of the latch inwardly toward the connector body 316 and, thus, allowing the connector 300 to be decoupled from a coupling.

Figure 2:
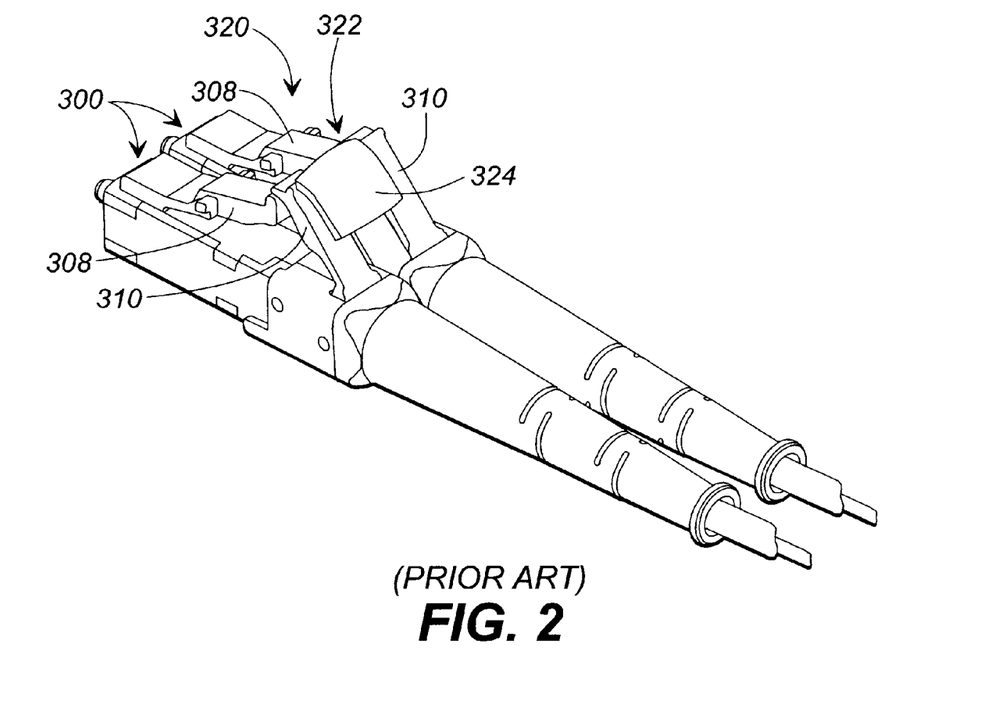
FIG. 2 is a perspective view of a prior art duplex LC connector.

Prior art duplex LC type connectors, such as connector 320 shown in FIG. 2, for example, typically are constructed by joining together a pair of simplex connectors 300, for instance. The simplex connectors 300 can be joined together by using one or more clips 322, which typically engage between adjacent side surfaces of the connectors. Although each simplex connector 300 typically is configured with its own latch 308 and trigger 310, the clip 322 typically is configured with a pivotable planar structure 324 which engages the upper surface of each trigger, thereby enabling an technician to manually deflect both triggers and, thus, both latches simultaneously.

Figure 3:
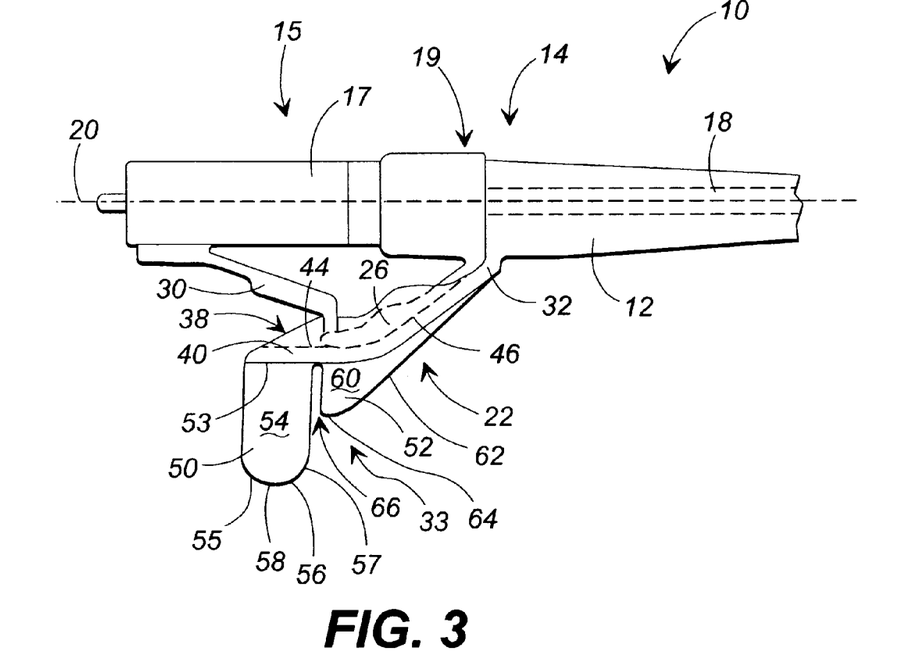
FIG. 3 is a side elevation view of an LC connector incorporating a preferred embodiment of the strain relief apparatus of the present invention.

As shown in FIG. 3, a preferred embodiment of the strain relief apparatus 10 of the present invention is made from a flexible material, such as an elastomeric material, and incorporates a body member 12 preferably configured as a tapered cylinder having a first diameter at its front end 14 and a smaller diameter at its back end. Strain relief apparatus 10 cooperates with a connector 15 and includes an axial bore 18 extending through body member 12, preferably along a longitudinal axis 20 and which substantially coincides with the axis of the connector 15, with the axial bore being configured with a sufficient diameter to receive an optical cable.

A flap 22 is formed at the front end 14 of the strain relief apparatus 10 and extends outwardly from body member 12. As the strain relief apparatus 10 engages a connector 15, so that its front end 14 is arranged adjacent the cable-receiving end 19 of the housing 17 of the connector, the flap 22 is oriented in an overlying relationship with a trigger 26 which extends as a cantilevered member from the top side of the connector 15. In preferred embodiments of the strain relief apparatus 10, a pocket 38 is formed in the underside of flap 22 for receiving the trigger 26. So configured, trigger 26 is partially enclosed by opposing side walls 40 of the flap with the lower surface 44 of the flap preferably engaging an upper surface 46 of the trigger.

Figure 4:
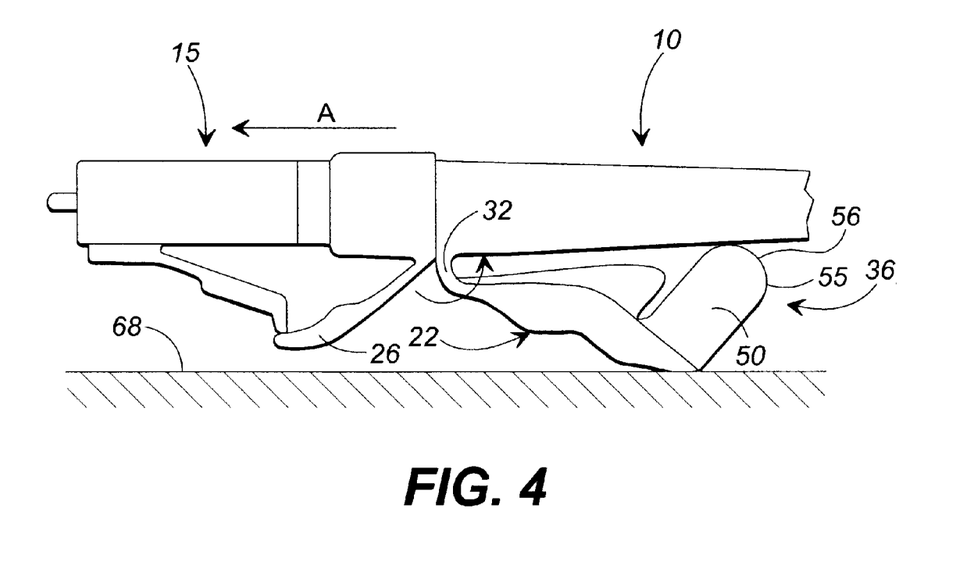
FIG. 4 is a side elevation view of the LC connector of FIG. 3, with the flap of the strain relief apparatus in its rearwardly-displaced position.

Attachment of the flap 22 to the body member 12 is facilitated by a living hinge 32, formed of a flexible material, which also allows the flap to be displaced from its unbiased position 33 (FIG. 3) toward the connector 15 to a forwardly-displaced position 34 (FIG. 5), where engagement of the flap with the trigger 26 urges the trigger toward the bottom side of the housing 17, thereby urging the latch 30 to move to its unlatched position. The living hinge 32 also allows the flap 22 to be displaced away from the connector 15 to a rearwardly-displaced position 36 (FIG. 4). Thus, the living hinge 32 allows the flap to be moved through an arc from its forwardly-displaced position 34, through its unbiased position 33, to its rearwardly-displaced position 36, such as during tight-fit situations.

As shown in FIG. 3, a handle 50 and deflection fin 52 extend outwardly from an upper surface 53 of the flap 22, with the handle and deflection fin preferably being oriented along a longitudinal axis of the flap. As described in greater detail hereinafter, the handle 50 is sized and shaped so as to be easily grasped by a technician, so that the technician can manipulate the connector 15 during patching operations. The handle 50 includes opposing side surfaces 54 (one of which is shown) and a perimeter or edge wall 56, which preferably is rounded at the front portion 55 and the rear portion 57 of its distal end 58. Deflection fin 52 also includes opposing side surfaces 60 (one of which is shown) and an edge wall 62. The height of deflection fin 52, as measured from the upper surface 53 of the flap to the edge wall 62 of the deflection fin increases from the living hinge 32 to the distal end 64 of the deflection fin. This configuration decreases the likelihood of the connector 15 snagging on a surface, such as can occur during patching operations when the connector is being drawn in direction B (FIG. 5), because the sloped portion of edge wall 62 tends to deflect the connector away from any surface coming into engagement with the deflection fin. A gap 66 also is provided between the handle 50 and the deflection fin 52 in order to facilitate controlled bending of the flap 22, as described hereinafter.

As shown in FIG. 4, when the flap 22 is snagged on a surface, e.g. surface 68, such as can occur during patching operations as the connector 15 is drawn in direction A through a patch panel, the living hinge 32 allows the flap 22 to be deflected to its rearwardly-displaced position 36. Thus, the deformable nature of a strain relief apparatus 10 allows patching of the connector 15 to continue, e.g. the connector 15 can continue to be drawn through a patch panel in direction A, assuming that another portion of the connector, i.e. the trigger 26, also does not get snagged on the surface. The rounded edge wall 56 of the front portion 55 of the handle 50 also decreases the likelihood of the connector 15 snagging on a surface when being pulled in direction A, by deflecting the connector away from the potentially obstructing surface as the rounded edge wall 56 is brought into engagement with that surface.

Figure 5:
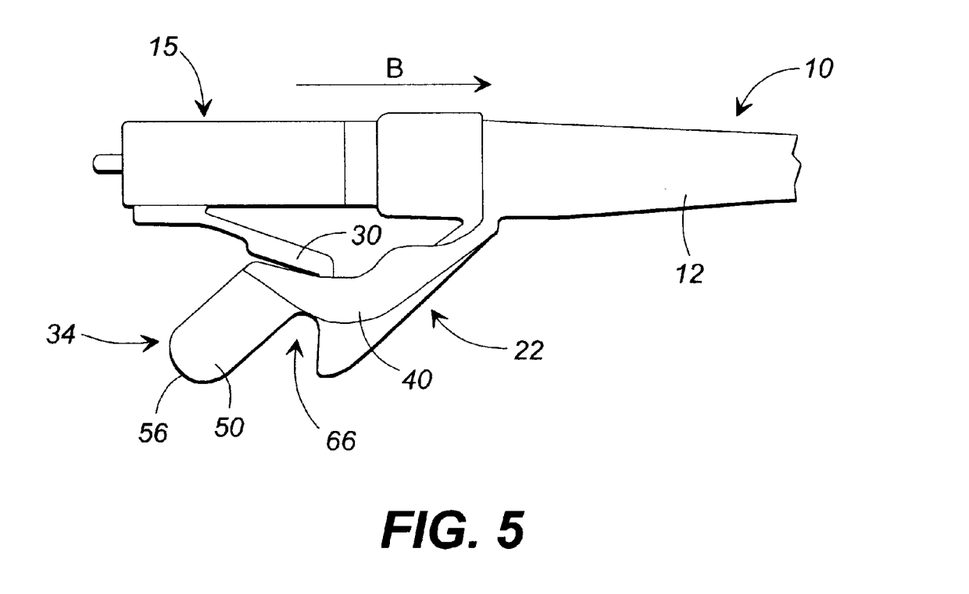
FIG. 5 is a side elevation view of the LC connector depicted in FIGS. 3 and 4, with the flap in its forwardly-displaced position.

As shown in FIG. 5, the preferred flap configuration also permits deflection of the flap 22 to its forwardly-displaced position 34, which typically is achieved by a deformation of the flap 22 and its side walls 40 in the vicinity of the gap 66. As described hereinbefore, the rounded edge wall 56 of the handle 50 also reduces the tendency of the connector 15 to be snagged when drawn in direction B. The compliant nature of the strain relief apparatus 10 also facilitates convenient removal of a connector 15 from a coupling. For instance, when the connector 15 is engaged within the connector-receiving cavity of a coupling and the flap 22 is deflected to its forwardly-displaced position 34 in order to urge the latch 30 to its unlatched position, the flap 22 attempts to restore to its unbiased position 33 (FIG. 3). Thus, as the connector 15 is unlatched from the coupling, the flap 22 transmits a restoring force through the body member 12 and to the connector 15, thereby urging the connector to withdraw from the connector-receiving cavity of the coupling.

Figure 6:
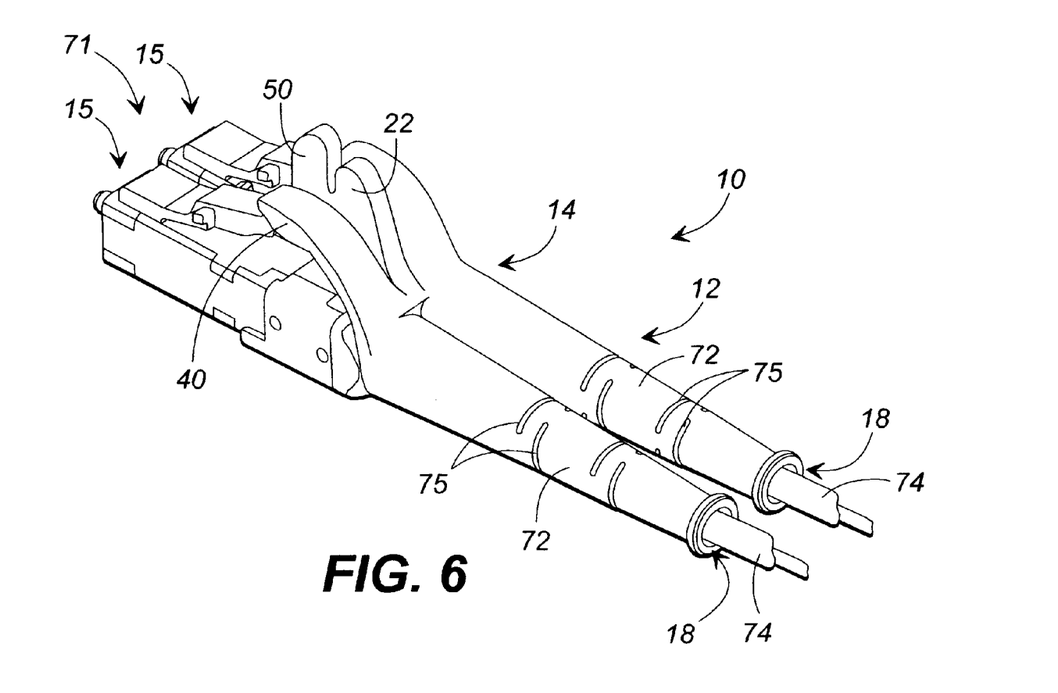
FIG. 6 is a perspective view of a duplex LC connector incorporating a preferred embodiment of the strain relief apparatus.

As depicted in FIG. 6, a preferred embodiment of the strain release apparatus 10 is adapted for use with duplex LC connectors, such as duplex connector 71. In the embodiment of FIG. 6, body member 12 incorporates two strain relief boots 72 that are each formed as tapered cylindrical members and which each include an axial bore 18 for receiving an optical cable 74. The body member 12 preferably incorporates one or more circumferentially oriented grooves 75 which perform a bend-limiting function for the cable, as described in U.S. Pat. No 5,461,690, issued to Lampert, for instance. Flap 22 extends from the front end 14 of the body member 12 and preferably incorporates the handle 50 and deflection fin 52 along a central longitudinal axis of the strain relief apparatus. Additionally, the underside of flap 22 preferably includes a divider wall (not shown), which is oriented along the central longitudinal axis and which cooperates with side walls 40 to form a pair of pockets (not shown) that are adapted to receive the triggers of their respective connectors 15.

Figure 7:
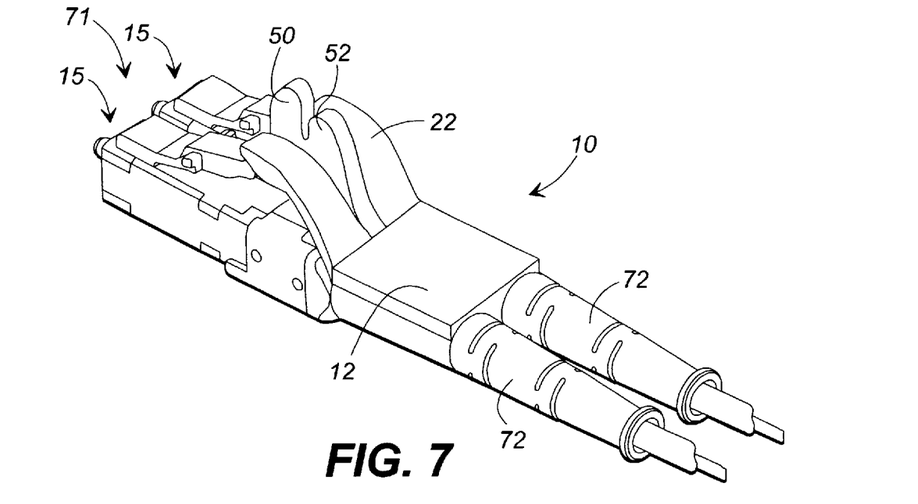
FIG. 7 is a perspective view of a duplex LC connector incorporating an alternative embodiment of the strain relief apparatus.
Figure 8:
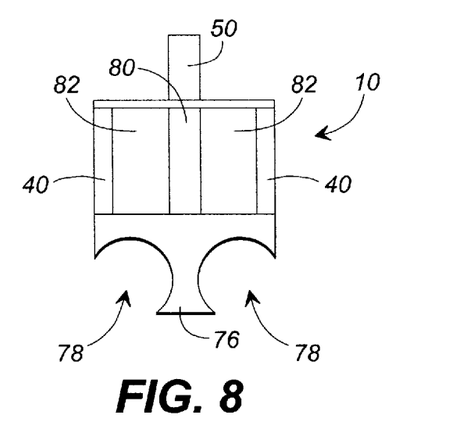
FIG. 8 is a front view of the strain relief apparatus depicted in FIG. 7.
Figure 9:
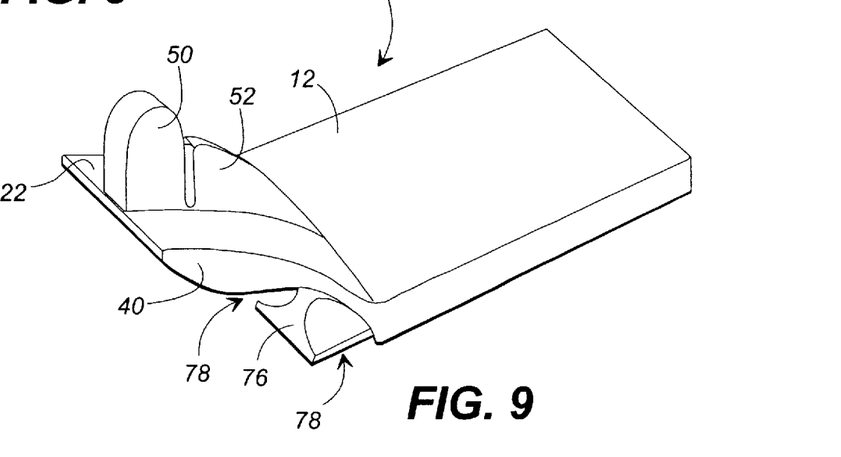
FIG. 9 is a perspective view of the embodiment of the strain relief apparatus depicted in FIGS. 7 and 8.

As shown in FIGS. 7–9, an alternative embodiment of the strain relief apparatus 10 is configured as an adapter for modifying prior art duplex connectors. Preferably, these adapter-configured embodiments each incorporate a divider wall 76 extending downwardly from body member 12 to form a pair of cavities 78 along the underside of the body member 12. Each of the cavities 78 extends substantially along the length of the body member 12 and is sized and shaped to engage a strain relief boot 72. As shown in FIG. 8, the underside of flap 22 can incorporate a divider wall 80, which preferably is oriented along a central longitudinal axis of the strain relief apparatus and which cooperates with side walls 40 to form a pair of pockets 82 that are adapted to receive the triggers 26 of their respective connectors.

Figure 10A:
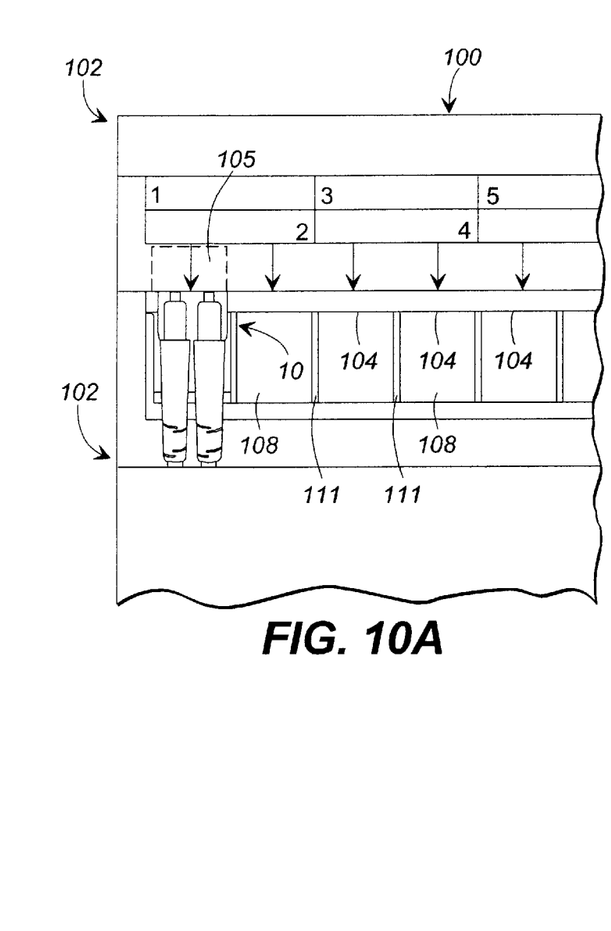
FIG. 10A is a front view of a pull-insertion type patch panel which is adapted to accommodate pull-insertion of an LC connector incorporating a strain relief apparatus.
Figure 10B:
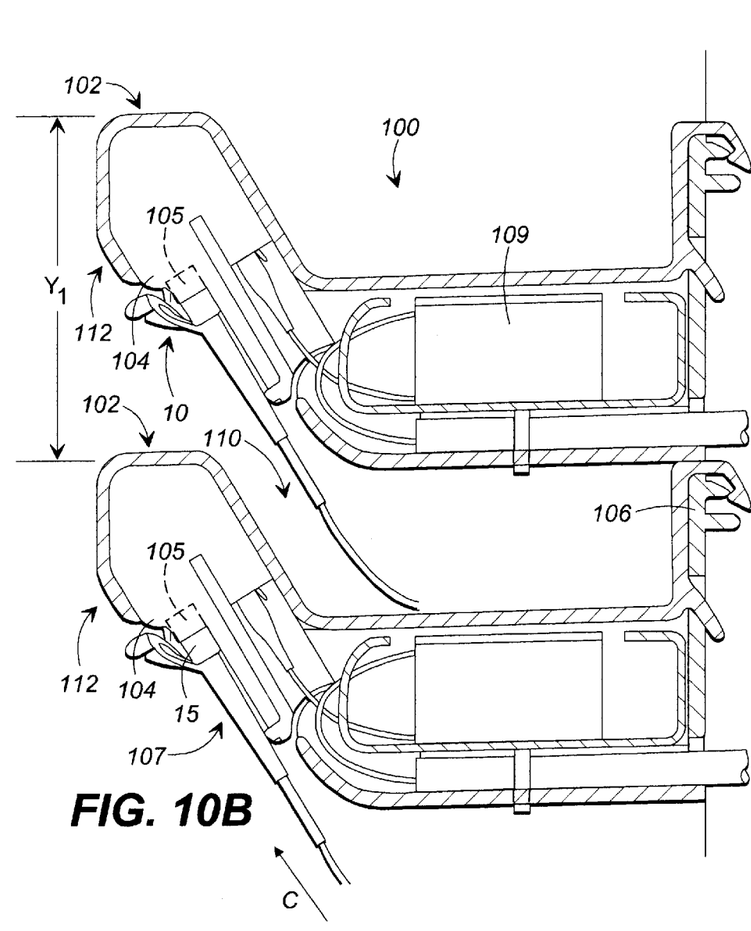
FIG. 10B is a partially cut-away, cross-sectional, side view of the patch panel of FIG. 10A.

A patch cord incorporating a strain relief apparatus 10, such as shown in FIGS. 3–7, is particularly well suited for use in pull-insertion type patch panels, a preferred embodiment of which is shown in FIGS. 10A and 1 10B. Patch panel 100 includes one or more coupling mounting brackets 102, which each incorporate a series of couplings 104, with the couplings preferably being arranged in a side-by-side relationship across the width of each mounting bracket 102. The couplings 104 are oriented with their connector-receiving cavities 105 facing toward the mounting rack 106 of the patch panel, thereby presenting an insertion-direction C for a connector 15 of a patch cord 107 that is oriented away from the mounting rack and, typically, toward a technician performing patching operations on the patch panel. Since the connector-receiving cavities 105 typically are not viewable by a technician, guide channels 108, formed by spaced guide walls 111, are provided for directing a connector toward engagement with a connector-receiving cavity 105.

Preferably, each mounting bracket 102 supports one or more spool racks 109 about which excess cable can be wound and stored. For patch panels 100 incorporating more than one mounting bracket 102, the brackets can be spaced vertically from each other in order to form a space or raceway 1 10 between the upper surface of the lower bracket 102 and the lower surface of the upper bracket 102 for accommodating the passage of cables therethrough. A vertical spacing ($Y_1$) of approximately 1.5 U (2.625 inches) can be accommodated by this configuration. Additionally, each mounting bracket 102 typically extends a length of approximately 4.87 inches from its mounting rack 106.

Each coupling 104 is mounted to a coupling rack 112, which is pivotally attached to its mounting bracket 102, such as by a pivot pin (not shown), for instance, so that the coupling rack 112 and its associated couplings 104 can be moved to a winding position 114 (FIG. 11), thereby facilitating insertion of a buffered fiber connector 116, which interconnects a buffered fiber 117 of an optical cable 118, within a cable-receiving cavity 119 of the coupling rack 112. After the buffered fiber connector 116 is engaged within the cable-receiving cavity 119, the coupling rack 112 is then pivoted to its stowed position 115 and a cover 120 is snapped into place, thereby protecting the cables 118 and connectors 116 stored therein.

Figure 11:
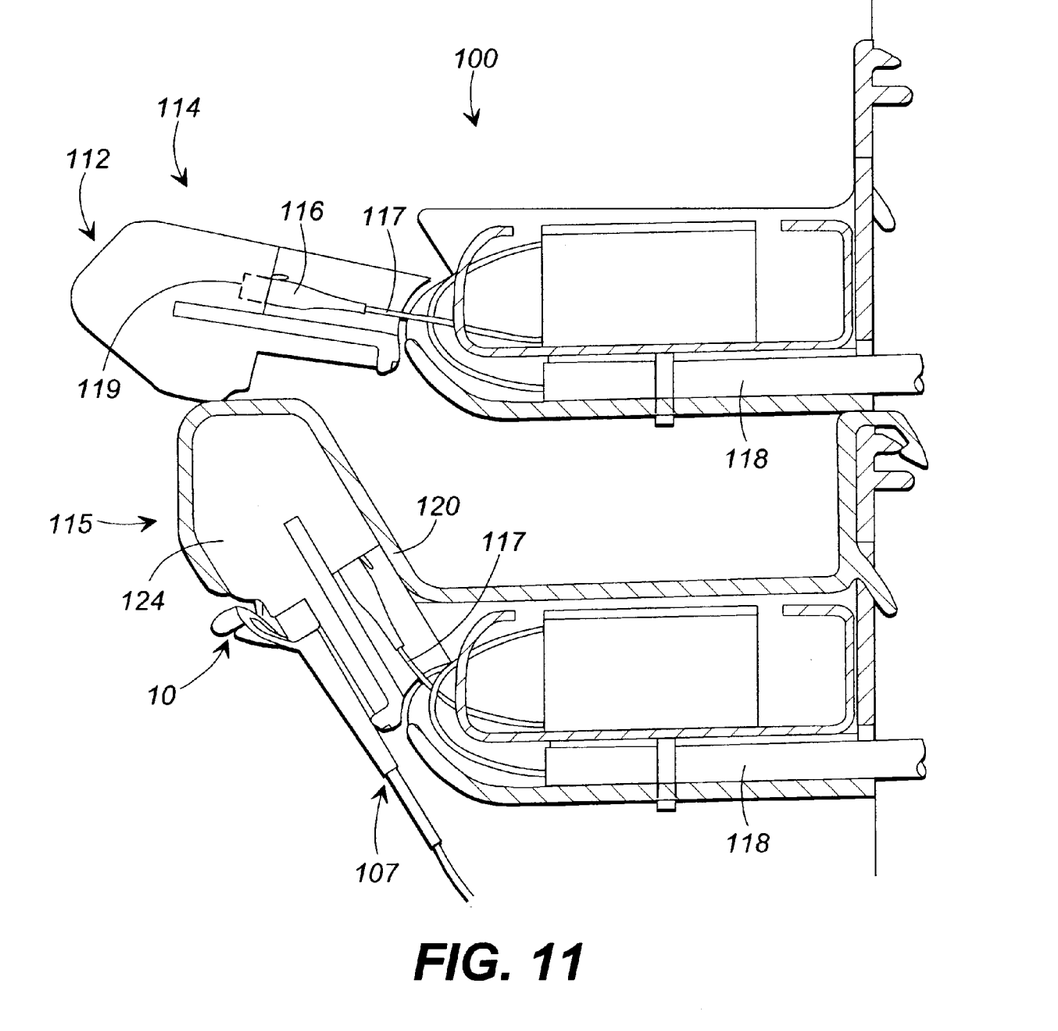
FIG. 11 is a partially cut-away, cross-sectional, side view of a pull-insertion type patch panel, with one of its coupling racks moved to its winding position.

In the embodiments shown in FIGS. 10A–11, optical communication between the patch cord 107 and the fiber 117 of the optical cable 118 preferably is facilitated by a fiber bend module 124, which allows the patch cord to optically communicate with the fiber of the cable with virtually no loss to the optical signal associated with the turn of the signal within the bend module 124. A fiber bend module 124 employing Miniature Bend Technology™ (manufactured by Thomas & Betts of Memphis, Tenn.), for instance, has been found suitable for such use, although other modules and/or configurations can be utilized (such as that shown in FIG. 14F, for example), depending on the particular application. In particular, if the separation distance between the connector-receiving cavity 105 and the cable-receiving cavity 119 is a sufficient distance, a fiber bend module 124 need not be utilized.

Figure 12:
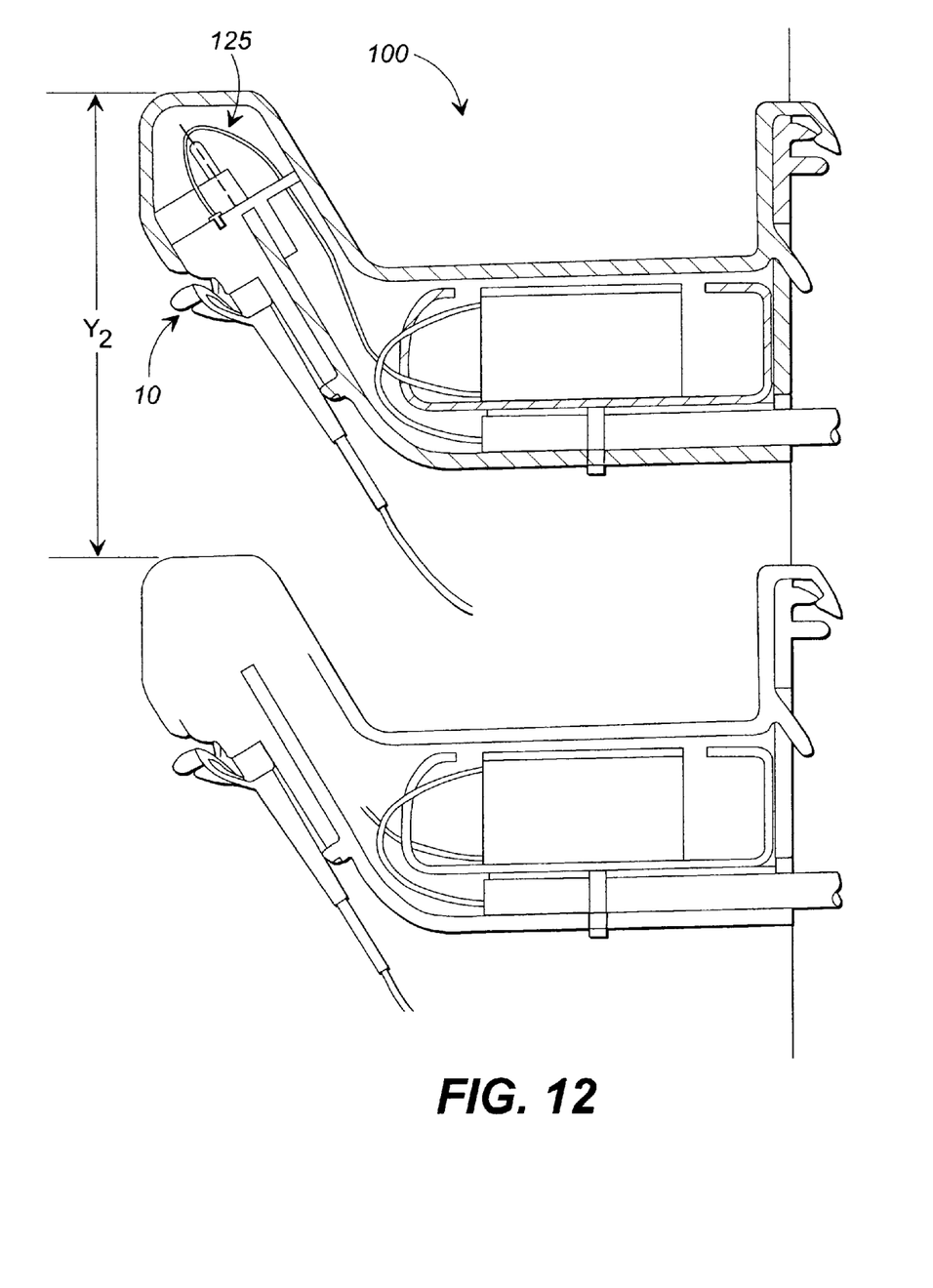
FIG. 12 is a partially cut-away, cross-sectional, side view of an alternative patch panel configuration incorporating miniature bend technology.

As shown in FIG. 12, a preferred embodiment of a patch panel 100 incorporates a fiber bend module 125 which does not utilize Miniature Bend Technology™. This patch panel configuration has the potential of being manufactured for a lower cost than the embodiments of FIGS. 10A–11, because it does not require the need of a second optical connector, e.g. the connector 116 (FIG. 11). However, a lower coupling density is provided than that achieved by the use of a fiber bend module 124, (a 2 U or 3.5 inch vertical spacing ($Y_2$) being required versus the 1.5 U spacing, described hereinbefore).

Figure 13:
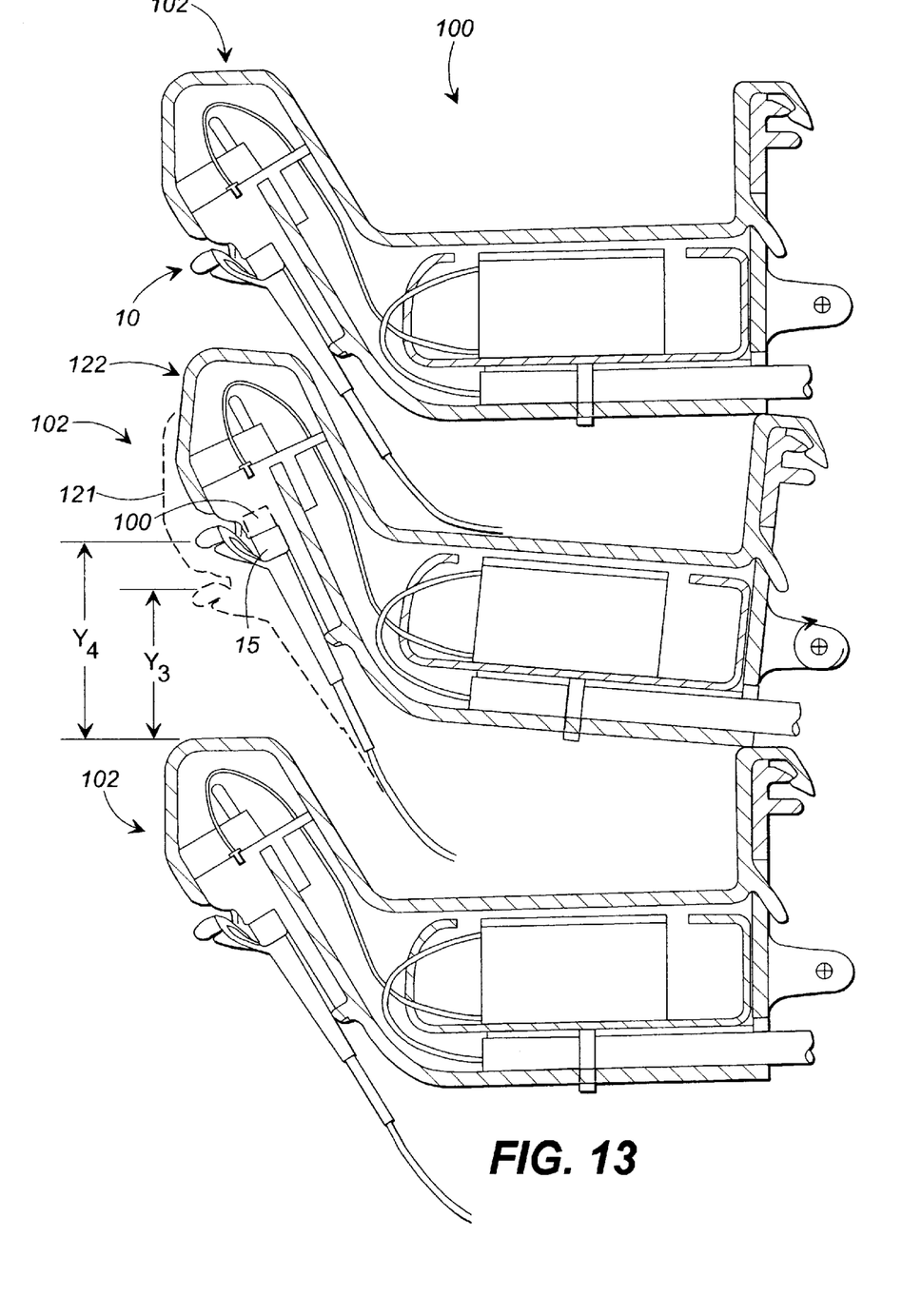
FIG. 13 is a partially cut-away, cross-sectional, side view of an alternative embodiment of a pull-insertion type patch panel utilizing a pivoting mounting bracket.

As shown in FIG. 13, an alternative embodiment of the patch panel 100 incorporates mounting brackets 102 that are pivotally attached to the mounting rack 106, thereby allowing each mounting bracket 102 to pivot between a stowed position 121 (represented by phantom lines on the center mounting bracket 102) and a patching position 122. Thus, by pivoting the mounting bracket 102 upwardly from the stowed position 121 to the patching position 122, the space between the connector-receiving cavity 105 of a mounting bracket 102 and the upper most surface of the mounting bracket 102 located immediately therebelow is increased, e.g. from $Y_3$ to $Y_4$, thereby making it easier for a technician to perform patching operations. After inserting a connector 15 into the connector-receiving cavity 105, the mounting bracket 102 can be lowered to its stowed position 121. So configured, the patch panel 100 of FIG. 13 provides an increased coupling density over similar patch panels that do not incorporate the pivoting mounting bracket feature.

Figure 14A:
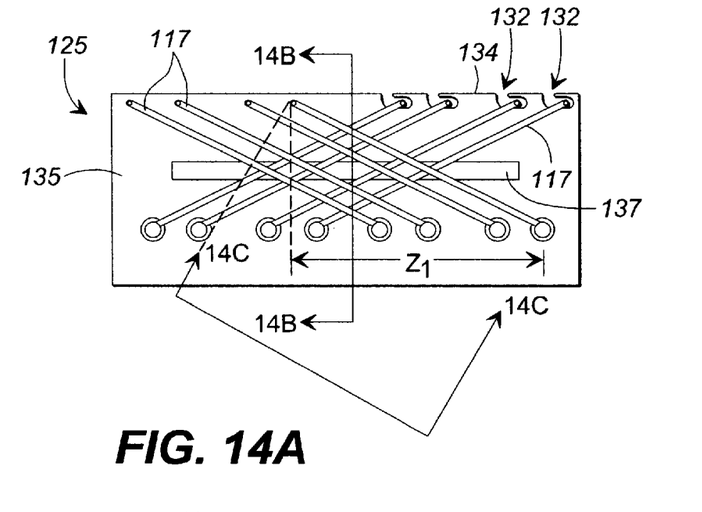
FIG. 14A is a top or plan view of the fiber bend module of FIGS. 12 and 13.
Figure 14B:
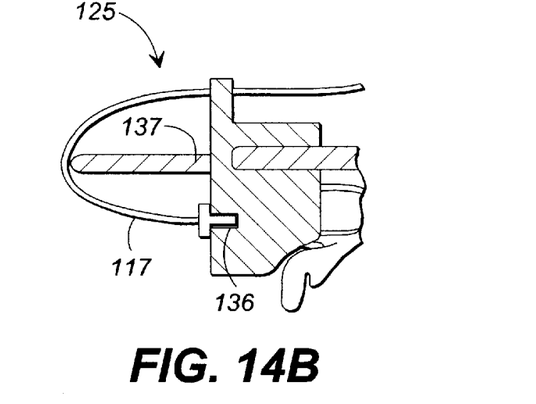
FIG. 14B is a partially cut-away, cross-sectional, side view of the fiber bend module depicted in FIG. 14A, as viewed along section line 14B—14B.
Figure 14C:
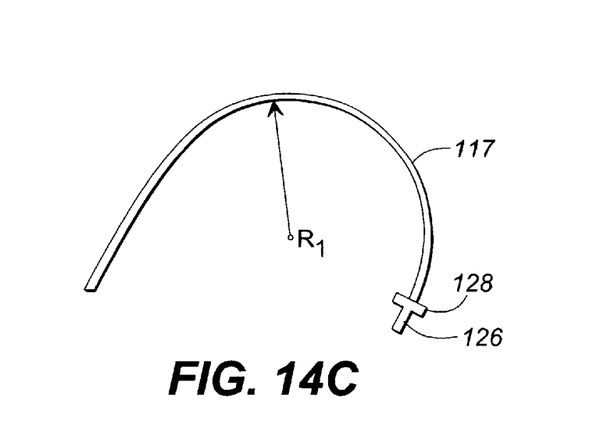
FIG. 14C is a partially cut-away, side view of the fiber bend module depicted in FIG. 14A, as viewed along section lines 14C—14C.

Referring now to FIGS. 14A–14F, the arrangement of optical fibers 117 within the fiber bend module 125 will be described. As shown in FIGS. 14A–14C, a fiber 117 extends into the fiber bend module 125 and toward a coupling 104. Typically, the fiber 117 terminates in an alignment ferrule 126 which includes a barrel 128 extending radially therefrom. As fiber 117 enters the fiber bend module 125, the fiber 117 is positioned within an alignment notch 132, preferably formed on a rear edge 134 of the base 135 of the bend module 125. In order that the fiber 117 is not bent through an improperly small radius of turn, which could damage the fiber or cause transmission loss, the fiber 117 is retained within the notch 132. The fiber 117 is then directed over a fence 137 and the terminated end of the fiber 117 is engaged within a coupling alignment sleeve 136 which is arranged at a lateral offset at a distance ($Z_1$) of approximately 1.3 inches from the notch 132. As shown in FIG. 14C, the aforementioned arrangement provides the required minimum bend radius to the optical fiber 117 and, in particular, preferably provides the fiber 117 with a bend radius $R_1$ of approximately 0.75 inches. Typically, eight fibers 117 are accommodated in the bend module 125, although numerous other arrangements can be provided for accommodating any number of fibers.

Figure 14D:
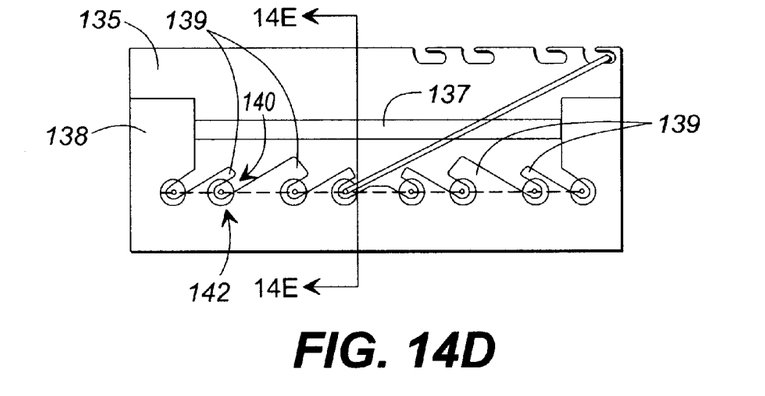
FIG. 14D is a top view of a retainer cap shown installed in the fiber bend module of FIGS. 14A and 14B.
Figure 14E:
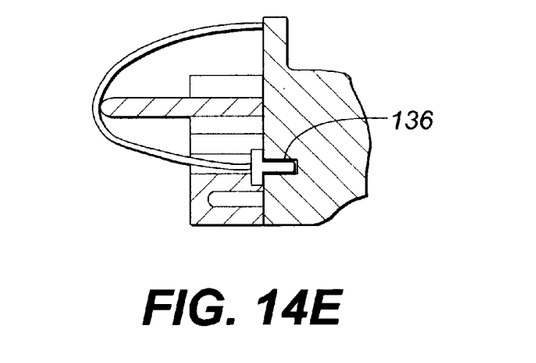
FIG. 14E is a side view of the fiber bend module of FIG. 14D, as viewed along section line 14E—14E.

As shown in FIGS. 14D and 14E, a retainer cap 138 is adapted to retain the alignment ferrules 126 of the fibers 117 within the coupling alignment sleeves 136 of the bend module 125. The retainer cap 138 incorporates a series of retainer walls 139 which are spaced from each other to provide a series of channels 140 between adjacent retainer walls 138, with the walls 138 merging to define an end portion 142 of each channel. Each channel 140 corresponds to a fiber 117 and accommodates passage of its respective fiber 117 from its alignment notch 132 to its coupling alignment sleeve 136. So configured, when the retainer cap 138 engages the base 135 of the fiber bend module, the barrels 128 of the fibers are entrapped between the base 135 and the retainer cap 138 at the end portion 142 of the channels 140, thereby maintaining the fibers 117 in a proper orientation within the fiber bend module 125.

Figure 14F:
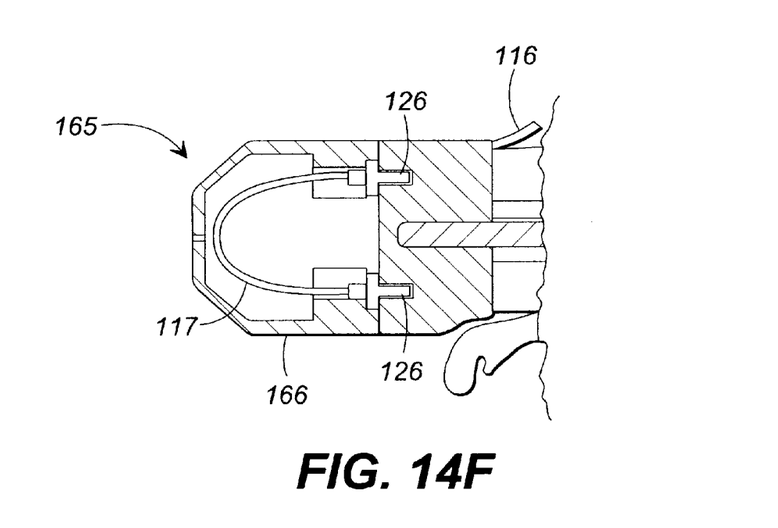
FIG. 14F is a partially cut-away, cross-sectional, side view of an alternative embodiment of a fiber bend module.

As shown in FIG. 14F, an alternative embodiment of the fiber bend module 165 incorporates optical fibers 117 and provides functionality similar to that shown in the bend module 124 of FIG. 11. Retainer cap 166 also provides an enclosure for the fiber.

Figure 15A:
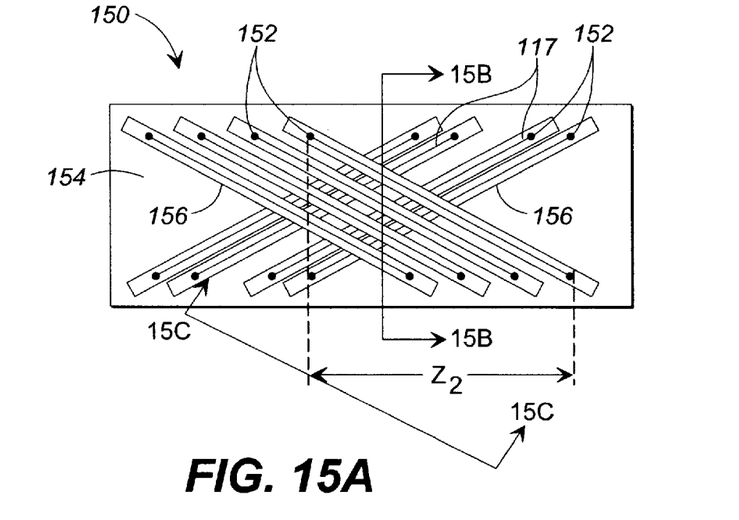
FIG. 15A is a top view of an alternative embodiment of the fiber bend module utilizing 3M Telecom System's VF-45 connections.
Figure 15B:
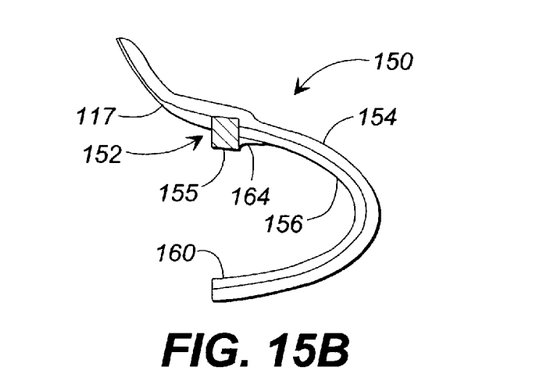
FIG. 15B is a side view of a fiber bend module depicted in FIG. 15A, as viewed along section line 15B—15B.
Figure 15C:
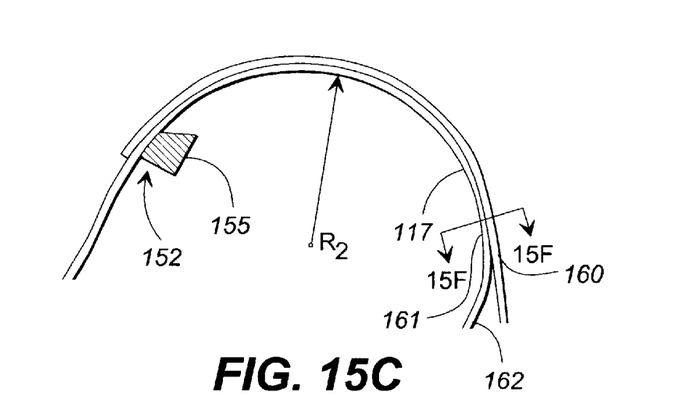
FIG. 15C is a partially cut-away, side view of the fiber bend module of 15A, as viewed along section line 15C—15C.

As shown in FIGS. 15A–15F, an alternative embodiment of the fiber bend module 150 incorporates optical fibers 117 that can be arranged in accordance with V-groove optical connection technology, i.e. VF-45, developed by 3M Telecom Systems, and can be utilized in embodiments of the patch panel 100. As fiber 117 enters the fiber bend module 150, the fiber 117 is passed through an alignment orifice 152 formed through the base 154 and guide 155 of the bend module 150. In order that the fiber 117 is not bent through an improperly small radius of turn, the fiber 117 is directed through a channel 156 which directs the fiber 117 to an alignment V-groove 160, which is laterally offset at a distance ($Z_2$) of approximately 1.3 inches from the alignment orifice 152, at splice interface 161, where the fiber 117 optically communicates with a jumper fiber 162. As shown in FIG. 15C, the aforementioned arrangement provides the required minimum bend radius to the optical fiber 117 and, in particular, preferably provides the fiber 117 with a bend radius $R_2$ of approximately 0.75 inches. Typically, eight fibers 117 are accommodated in the bend module 150, although numerous other arrangements can be provided for accommodating any number of fibers.

Figure 15D:
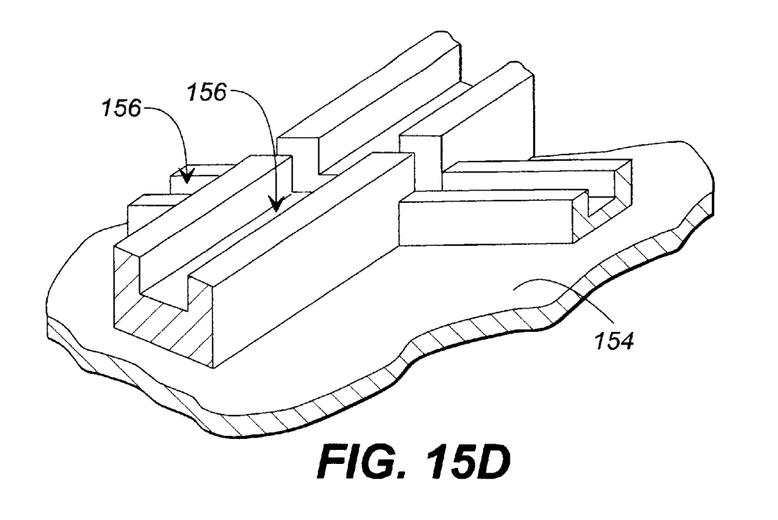
FIG. 15D is a partially cut-away, perspective view showing detail of the crisscrossing optical fibers of the fiber bend module of FIGS. 15A–15C.
Figure 15E:
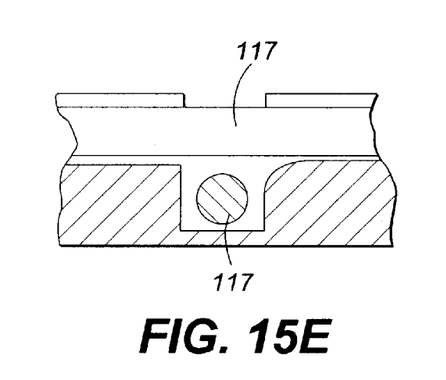
FIG. 15E is a partially cut-away, cross-sectional, side view showing detail of the criss-crossing optical fibers of the fiber bend module of FIGS. 15A–15D.
Figure 15F:
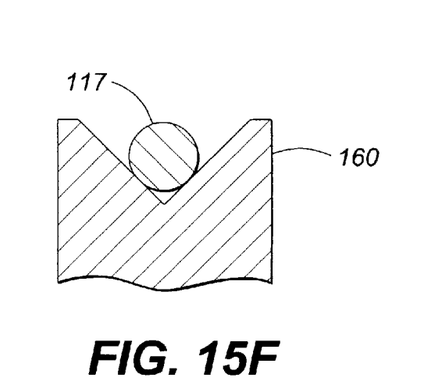
FIG. 15F is a partially cut-away, side view of the fiber bend module of 15C, as viewed along section line 15F—15F.

As shown in FIGS. 15D and 15E, proper orientation of the fibers 117 within the fiber bend module 150 is maintained by the channels 156 which are arranged in an interwoven matrix of channels, with the channels being spaced at various heights above the base 154 to allow for crisscrossing of the fibers 117. Additionally, adhesive 164 (FIG. 15B) preferably is applied to maintain the fibers in their channels.

As described hereinbefore, the present invention provides a technician with a handle which is suitable for grasping, thereby making it easier for the technician to manipulate a connector, such as during patching operations. The handle conveniently allows for insertion of the connector into, and removal of the connector from various receptacles, such as those typically mounted on pull-insertion type patch panels, for instance. Manipulation of connectors about patch panels can be difficult because increased coupling density, e.g. reduced spacing between adjacent couplings, makes it difficult to grasp a typical connector about its sides while attempting to engage the connector with the patch panel coupling. However, since the handle of the present invention typically extends below the couplings, the technician typically can manipulate the connector by utilizing the handle without interfering with, or being interfered by the connectors of adjacent couplings. Additionally, the compliant nature of the flap, from which the handle extends, allows the strain relief apparatus easily to be drawn through patch panels, such as during patching operations, because the flap readily deforms and yields to typical obstructions encountered by the apparatus.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. In particular, although the present invention has been described in relation to LC type simplex and duplex connectors, the present is equally well suited for use with connectors of various sizes, shapes, and configurations, such as ST, SC and FC connectors, among others. All such modifications and variations, are within the scope of the invention as determined by the appended claims when interpreted in accordance with the breadth to which they are fairly and legally entitled.

What is claimed is:

1. A strain relief apparatus for use with a connector, the connector having a plug end adapted to be inserted into a coupling, a cable-receiving end adapted to receive a cable containing a transmission medium, a top side and a bottom side, the top side having a latch and a trigger mounted thereon, the latch being movable between a latched position and an unlatched position, the trigger being formed as a cantilevered member having an upper surface and forming an acute angle with the top side of the connector, the trigger being slidably engagable with the latch such that deflecting the trigger toward the bottom side of the connector urges the latch to the unlatched position, said strain relief apparatus comprising:

a body member having a first end facing the cable-receiving end of the connector, a second end facing away from the cable-receiving end of the connector, and a flap extending from said body member, said flap being movable between an unbiased position and a forwardly-displaced position, in said unbiased position said flap being oriented in an overlying relationship with the trigger, in said forwardly-displaced position said flap urging the trigger toward the bottom side of the connector such that the trigger urges the latch to said unlatched position, and said flap having an upper flap surface with a handle extending therefrom, said handle being configured such that moving said handle allows said flap to be repositioned from said unbiased position to said forwardly-displaced position.

2. The strain relief apparatus of claim 1, wherein said handle is oriented along a longitudinal axis of said body member.

3. The strain relief apparatus of claim 1, wherein said body member has a first cavity formed therein, said first cavity being configured to receive the cable and to cooperate with the cable-receiving end of the connector such that the cable extends through said first cavity and engages the cable-receiving end of the connector.

4. The strain relief apparatus of claim 1, wherein said body member has a first axial bore extending therethrough along a first longitudinal axis thereof, said first axial bore being configured to receive the cable therethrough and to cooperate with the cable-receiving end of the connector such that the cable extends through said first axial bore and engages the cable-receiving end of the connector.

5. The strain relief apparatus of claim 1, wherein said flap has a deflection fin extending from said upper flap surface, said deflection fin and said handle being oriented along a longitudinal axis of said strain relief apparatus with said deflection fin being disposed between said handle and said body member, said deflection fin being configured with an increasing height, as measured from said upper flap surface to an edge wall of said deflection fin, from said body member toward said handle.

6. The strain relief apparatus of claim 1, wherein said flap is attached to said body member by a flexible material.

7. The strain relief apparatus of claim 1, wherein said flap is movable to a rearwardly-displaced position where said flap is oriented in an overlying relationship with said body member such that said unbiased position is oriented along an arc between said rearwardly-displaced position and said forwardly-displaced position.

8. The strain relief apparatus of claim 1, wherein said flap has side walls extending therefrom, said side walls forming a pocket therebetween on an underside of said flap, said pocket being configured to receive the trigger of the connector.

9. The strain relief apparatus of claim 1, wherein said body member is made from a flexible material which is sufficiently stiff to limit the minimum bend radius of the cable.

10. The strain relief apparatus of claim 3, wherein the connector is a duplex connector and the cable-receiving end is adapted to receive first and second cables, each of the first and second cables containing a transmission medium, and wherein said body member has a second cavity formed therein, said second cavity being configured to receive the second cable therethrough, such that the first cable extends through said first cavity and engages the cable-receiving end of the connector and said second cable extends through said second cavity and engages the cable-receiving end of the connector.

11. The strain relief apparatus of claim 4, wherein the connector is a duplex connector and the cable-receiving end is adapted to receive first and second cables, each of the first and second cables containing a transmission medium, and wherein said body member has a second axial bore extending therethrough along a second longitudinal axis, said first axial bore being configured to receive the first cable therethrough, said second axial bore being configured to receive the second cable therethrough.

12. The strain relief apparatus of claim 6, wherein said strain relief apparatus is formed as a unitary structure of elastomeric material.

13. The strain relief apparatus of claim 8, wherein the connector is a duplex connector having a first trigger and a second trigger, and said flap has a divider wall extending from said underside of said flap such that said pocket is divided into a first pocket and a second pocket, said first pocket being configured to receive the first trigger and said second pocket being configured to receive the second trigger.

14. A patch cord for use with a coupling, said patch cord comprising:

a first cable having a transmission medium therein;

a connector having a plug end adapted to be inserted into the coupling, a cable-receiving end adapted to receive said first cable, a top side and a bottom side, said top side having a latch and a trigger mounted thereon, said latch being movable between a latched position and an unlatched position, in said latched position, said latch being adapted to secure said connector to the coupling, in said unlatched position, said latch being adapted to decouple said connector from the coupling, said trigger being formed as a cantilevered member having an upper surface and forming an acute angle with said top side of said connector, said trigger being slidably engagable with said latch such that deflecting said trigger toward said bottom side of said connector urges said latch to said unlatched position, and;

a body member having a first end facing said cable-receiving end of said connector, a second end facing away from said cable-receiving end of said connector, and a flap extending from said body member, said flap being movable between an unbiased position and a forwardly-displaced position, in said unbiased position, said flap being oriented in an overlying relationship with said trigger, in said forwardly-displaced position, said flap urging said trigger toward said bottom side of said connector such that said trigger urges said latch to said unlatched position, said flap having an upper flap surface with a handle extending therefrom, said handle being configured such that moving said handle allows said flap to be repositioned from said unbiased position to said forwardly-displaced position.

15. A patch panel for mounting to a mounting surface and for interconnecting transmission media, said patch panel comprising:
   at least one patch cord having a first cable, a connector, and a body member;
   said a first cable having a transmission medium therein;
   said connector having a plug end adapted to be inserted into the coupling, a cable-receiving end adapted to receive said first cable, a top side and a bottom side, said top side having a latch and a trigger mounted thereon, said latch being movable between a latched position and an unlatched position, in said latched position, said latch being adapted to secure said connector to the coupling, in said unlatched position, said latch being adapted to decouple said connector from the coupling, said trigger being formed as a cantilevered member having an upper surface and forming an acute angle with said top side of said connector, said trigger being slidably engagable with said latch such that deflecting said trigger toward said bottom side of said connector urges said latch to said unlatched position, and;
   said body member having a first end facing said cable-receiving end of said connector, a second end facing away from said cable-receiving end of said connector, and a flap extending from said body member, said flap being movable between an unbiased position and a forwardly-displaced position, in said unbiased position, said flap being oriented in an overlying relationship with said trigger, in said forwardly-displaced position, said flap urging said trigger toward said bottom side of said connector such that said trigger urges said latch to said unlatched position,
   said flap having an upper flap surface with a handle extending therefrom, said handle being configured such that moving said handle allows said flap to be repositioned from said unbiased position to said forwardly-displaced position, and;
   a plurality of couplings, each of said couplings having a connector-receiving cavity configured to receive said connector in a first direction such that said first cable of said patch cord is directed toward the mounting surface when said connector is engaged within said connector-receiving cavity.

16. The patch panel of claim 15, wherein said couplings are configured in a side-by-side relationship and a guide channel is arranged adjacent each of said couplings, each of said guide channels being formed by spaced guide walls such that as said connector is directed toward said connector-receiving cavity said guide channel urges said connector into engagement with said connector-receiving cavity.

17. The patch panel of claim 15, wherein said couplings are arranged in rows of said couplings, with each of said rows being mounted to a mounting bracket, each of said mounting brackets being pivotable between a stowed position and a patching position, in said patching position, each of said couplings configured to engage said connector such that said first cable extends from said connector in a first direction and, in said stowed position, said first cable extends from said connector in a second direction.

18. The patch panel of claim 15, wherein said patch panel is adapted for interconnecting a fiber of an optical cable to said connector, said patch panel having a fiber bend module, said fiber bend module having a first side, an opposing second side, and a coupling ferrule arranged adjacent said second side, said coupling ferrule being adapted to receive and align a terminated end of the fiber of the optical cable, said fiber bend module being configured to maintain a minimum bend radius of the fiber of the cable as the fiber extends from said first side of said fiber bend module and engages said coupling ferrule.

19. The patch panel of claim 18, wherein said fiber bend module maintains said minimum bend radius of the fiber of the cable by providing a lateral offset of the fiber as the fiber extends from said first side of said fiber bend module to said coupling ferrule.

* * * * *